G. W. PETERSON.
PLOW.
No. 188,176. Patented March 6, 1877.
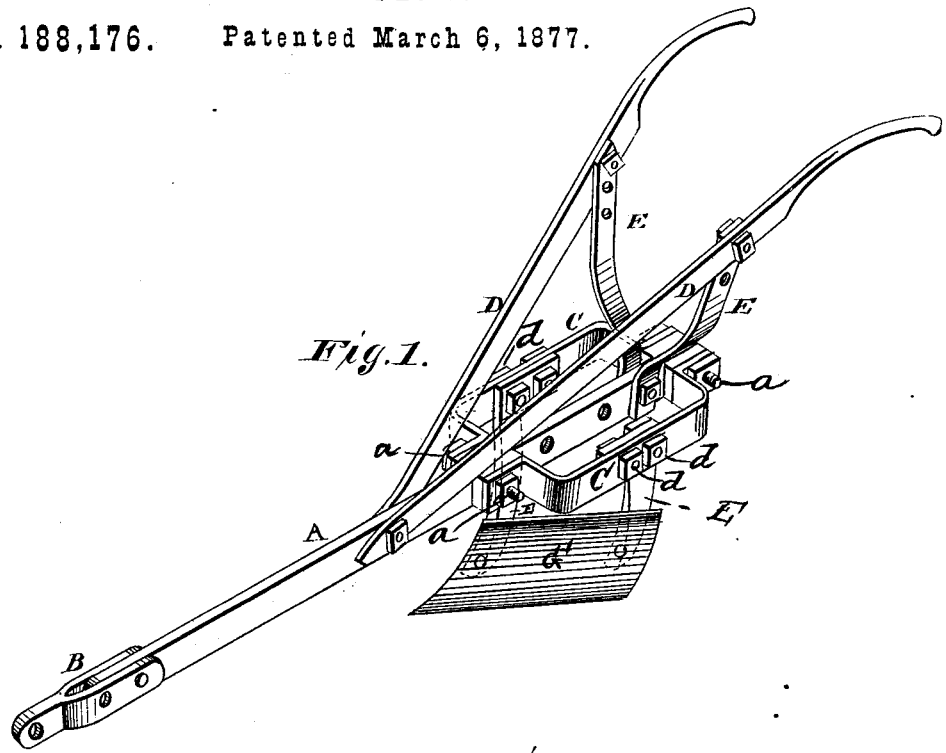
WITNESSES
Franck L. Durand
C. L. Evert
INVENTOR
G. W. Peterson
ATTORNEYS

UNITED STATES PATENT OFFICE.

GEORGE W. PETERSON, OF OXFORD, ALABAMA.

IMPROVEMENT IN PLOWS.

Specification forming part of Letters Patent No. 188,176, dated March 6, 1877; application filed December 13, 1876.

*To all whom it may concern:*

Be it known that I, GEO. W. PETERSON, of Oxford, in the county of Calhoun, and in the State of Alabama, have invented certain new and useful Improvements in Plows; and do hereby declare that the following is a full, clear, and exact description thereof, reference being had to the accompanying drawings, and to the letters of reference marked thereon, making a part of this specification.

The nature of my invention consists in the construction and arrangement of a cotton-cultivator, as will be hereinafter more fully set forth.

In order to enable others skilled in the art to which my invention appertains to make and use the same, I will now proceed to describe its construction and operation, referring to the annexed drawing, in which—

Figure 1 is a perspective view of my invention. Figs. 2 and 3 are perspective views of implements used in the same frame as shown in Fig. 1.

A represents a straight beam of suitable dimensions, provided at its front end with a clevis, B, said clevis being pivoted to the beam and adjustable up and down, as required. On each side of the beam A, at the rear end, is secured an angular beam, C, the ends of which are fastened to the center beam by bolts a a. D D are the handles of the cultivator, the front ends of said handles being fastened by a single bolt to the center beam A a suitable distance in front of the side beams C C. These handles are connected to the beam A by means of braces E E, as shown, and upon said braces the handles are adjustable up and down, so that the handles can be made to suit the height of the person operating the cultivator.

To each of the bowed side bars C is secured a standard, E E, by bolts d d, and to these standards is attached a plow or scraper, G'. One of these standards supports the plow near its point, and the other near its rear, thus bracing and supporting it firmly at both ends. As one of these standards depends from one of the frame and the other from the other side of the frame, the plow is held in a level position, and is more securely braced than would be the case if both were attached to one side.

In Figs. 2 and 3 I have represented a series of plow-shanks, G G, (each having an angular piece, b, at the top, with perforations x x,) to which blades may be attached, and which may be attached to the frame when the plow or scraper is not used. All of the shanks are provided with offsets y, which rest beneath and fit snugly against the under edges of the frame C, and assist in bracing the shanks and keeping rigidly in place.

It will thus be seen that any one of the shanks, having any desired plow or shovel attached thereto, may be connected to the side bars C at two points by two bolts, d d, thus making a perfectly rigid connection, at the same time admitting of any shank being readily removed from the side bars.

Having thus fully described my invention, what I claim as new, and desire to secure by Letters Patent, is—

The beam A and bowed frame C C, as constructed, in combination with the standards E E, secured to each side of the frame, with the plow G', supported near each end to the standards, as set forth.

In testimony that I claim the foregoing I have hereunto set my hand this 2d day of December, 1876.

GEORGE WASHINGTON PETERSON.

Witnesses:
JAMES R. DRAPER,
R. L. ALLEN.